United States Patent
Smith

(10) Patent No.: US 8,203,742 B2
(45) Date of Patent: Jun. 19, 2012

(54) PRODUCING POSTSCRIPT BITMAP IMAGES WITH VARYING DEGREES OF TRANSPARENCY

(75) Inventor: Glenn K. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1532 days.

(21) Appl. No.: 11/383,982

(22) Filed: May 18, 2006

(65) Prior Publication Data

US 2007/0268505 A1    Nov. 22, 2007

(51) Int. Cl.
*G06K 15/00* (2006.01)
*G06F 3/12* (2006.01)

(52) U.S. Cl. ....... 358/1.18; 358/1.9; 358/1.13; 345/629; 345/634

(58) Field of Classification Search ............ 358/3.28, 358/1.1, 1.9; 382/100, 232, 254, 276; 713/176
See application file for complete search history.

(56) References Cited

U.S. PATENT DOCUMENTS

| | | | |
|---|---|---|---|
| 6,032,004 A | 2/2000 | Mirabella, Jr. et al. | |
| 6,272,634 B1 * | 8/2001 | Tewfik et al. | 713/176 |
| 6,384,840 B1 * | 5/2002 | Frank et al. | 345/634 |
| 6,765,688 B1 * | 7/2004 | Claiborne | 358/1.18 |
| 7,003,723 B1 | 2/2006 | Kremer et al. | |
| 2002/0018233 A1 * | 2/2002 | Mori | 358/1.15 |
| 2003/0128379 A1 * | 7/2003 | Inoue | 358/1.9 |
| 2003/0131237 A1 | 7/2003 | Ameline et al. | |
| 2003/0142361 A1 | 7/2003 | Walton | |
| 2003/0219144 A1 * | 11/2003 | Rhoads et al. | 382/100 |
| 2005/0283611 A1 | 12/2005 | Wang et al. | |

* cited by examiner

*Primary Examiner* — Vincent Rudolph
(74) *Attorney, Agent, or Firm* — Gibb & Riley, LLC

(57) ABSTRACT

Embodiments herein include a method of combining a graphic image with other data to be printed, such as text or other graphics. One embodiment receives image data and document data and applies a mask to the image data to produce an image snippet. The mask adjusts a transparency of the image data in the image snippet by eliminating pixels from the image data. The method combines the document data and the image snippet into a page description language (PDL) file (PostScript file) using a print driver. One feature of the embodiments herein is that the image snippet is combined with the document data only by the print driver, and the image does not need to be combined downstream using an interpreter. After creating the PDL file, then the method processes the page description language file through an interpreter to produce raster data and prints the raster data on a media sheet using a printer.

12 Claims, 6 Drawing Sheets

PRODUCING POSTSCRIPT BITMAP IMAGES WITH VARYING DEGREES OF TRANSPARENCY

BACKGROUND

Embodiments herein generally relate to electrostatographic printers and copiers or reproduction machines, and more particularly, concerns using a print driver to produce PostScript bitmap images with varying degrees of transparency.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format™ ("PDF") and Postscript™ ("PS") both manufactured by Adobe Systems, Inc., located in San Jose, Calif., USA., as well as printer control language ("PCL"), manufactured by Hewlett Packard, located in Palo Alto, Calif., USA. Examples of non-ready for printer formats include the native application file formats for personal computer application programs such as Microsoft Word™. These file formats must be first converted to a ready for printer file format before they can be printed. Furthermore, some image file formats, such as the Tagged Image File Format ("TIFF") contain bit image data only which is already in a format which specifies its output location on the output media and does not contain printer control instructions for interpretation by the internal processing engine of the printer. See U.S. Pat. No. 7,003,723, the complete disclosure of which is incorporated herein by reference, for a more complete description of printer file formats.

Conventional print drivers provide many mechanisms to produce watermarks that are embedded with a page description language (PDL) print stream and are rendered onto print media (paper, transparencies, card stock, etc.) by a marking device. However, such watermark enabled print drivers are not comparable with a commonly used file format named to as PostScript. Therefore, a member of "work arounds" have been created to allow PostScript to be used with watermarks.

One example of such a "work around" is disclosed in U.S. Patent Publication 2003/0142361, the complete disclosure of which is incorporated herein by reference. Conventional PostScript watermarking solutions take a PDL file and then regenerate a watermarked PDL file. Also, conventional systems can be part of an interpreter in a printer which takes a file in a PDL and generates watermarked raster images, which are then printed. However, such conventional systems are inefficient because they require a first generation of an unwatermarked PDL file and then processing of the PDL file through a regeneration of the PDL or through an interpreted which adds the watermark.

SUMMARY

Thus, embodiments herein include a method of combining a graphic image with other data to be printed, such as text or other graphics. One embodiment receives image data and document data and applies a mask to the image data to produce an image snippet. The mask adjusts a transparency of the image data in the image snippet by eliminating pixels from the image data. The method combines the document data and the image snippet into a page description language (PDL) file (e.g., PostScript file) using a print driver. One feature of the embodiments herein is that the image snippet is combined with the document data only by the print driver and the image does not need to be combined downstream. After creating the PDL file, then the method processes the page description language file through an interpreter to produce raster data, and prints the raster data on a media sheet using a printer.

The method can vary the transparency according to the user input. In one embodiment, the page description language file comprises the snippet overlaid on the document data as a watermark. Another feature of embodiments herein is that the page description language file is only generated once and does not need to be regenerated. The image data can be limited to graphical, non-text data. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
FIG. 1 is a schematic diagram of an image to be included in the image shown in FIG. 2.
Figure 2:
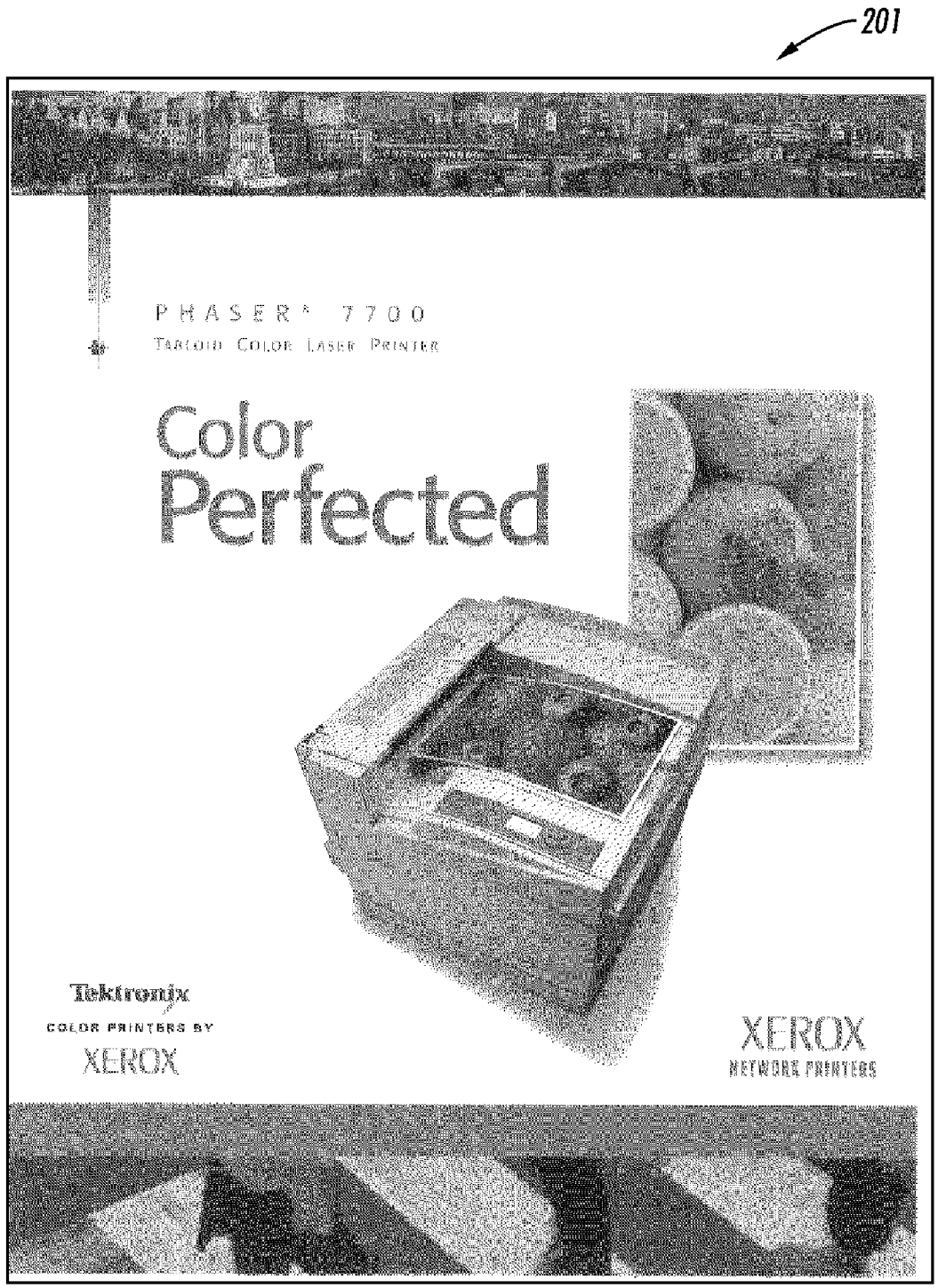
FIG. 2 is a schematic diagram of an image to be included in the image shown in FIG. 2.
Figure 3:
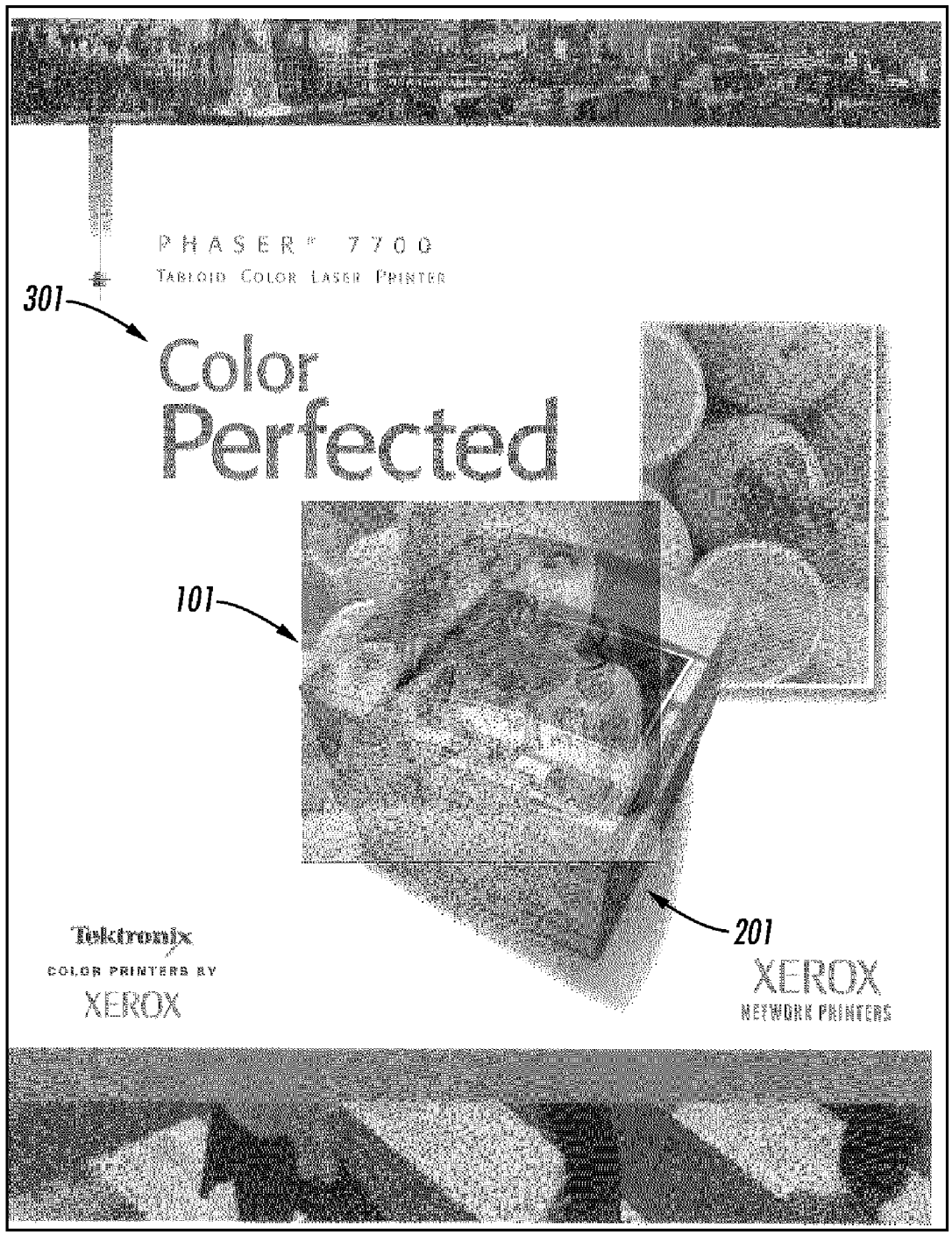
FIG. 3 is a schematic diagram of printing data combined with a transparency adjusted image from FIG. 1.

As mentioned above, embodiments herein are useful in combining a graphical image with an adjusted transparency (such as a watermark) with other data to be printed, such as data from the personal computer applications mentioned above. The other data can include text, graphics, etc. More specifically, the embodiments herein utilize an image processing method (which can be used in the printer or in the computing device) that generates image masks and corresponding PostScript code to allow adjusted transparency images to be combined with page description language files. For example, as shown in FIGS. 1 and 2, an image 101 can be provided, the transparency of the image 101 can be adjusted, and the adjusted transparency image 101 can be combined with other data to be printed 201 which results in a new document 301 which combines both elements 101 and 201.

Figure 4:
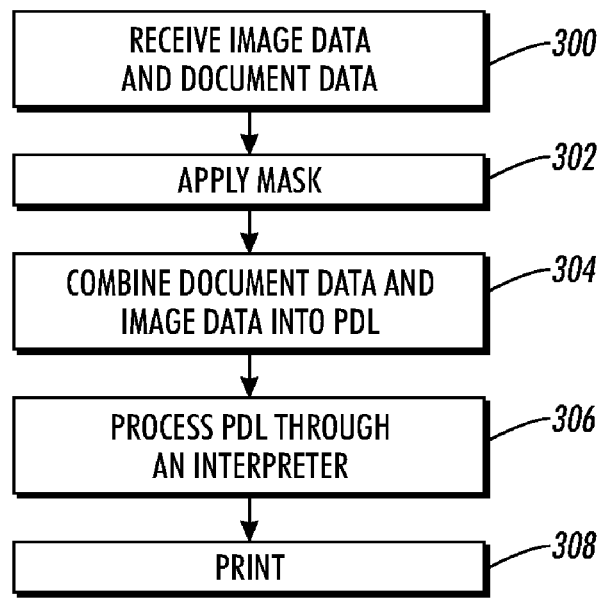
FIG. 4 is a flow diagram illustrating embodiments herein.

As shown in flowchart form in FIG. 4, embodiments herein include a method of combining a graphic image with other data to be printed, such as text or other graphics. In item 300, the method receives image data (first data) and document data (second data) and, in item 302, the method creates an image mask to be applied to the image data to produce an image snippet comprising of the image data and image mask. The methods for creating both the document data and image snippet along with their combination may include any mix of software applications, computer operating system components such as printer drivers, scripting languages such as Perl, or specially designed hardware. The specific combination shall be determined by the implementer of the embodiments. For the purposes of illustrating the embodiments, discussions will be limited to implementation with a printer driver. The mask adjusts a transparency of the image data in the image snippet by eliminating pixels from the image data. The method combines the document data and the image snippet into a page description language (PDL) file (e.g., PostScript file) using a print driver in item 304.

One feature of the embodiments herein is that the image snippet is combined with the document data only by the print driver and the image does not need to be combined downstream. After creating the PDL file, the method processes the page description language file through an interpreter to produce raster data (item 306) and prints the raster data on a media sheet using a printer in item 308. In one embodiment, the page description language file comprises the snippet overlaid on the document data as a watermark. Another feature of embodiments herein is that the page description language file is only generated once and does not need to be regenerated. The image data can be limited to graphical, non-text data.

The method can vary the transparency according to the user input. For example, with embodiments herein, an image can be printed using a Type 1 Imagemask that corresponds to the level of transparency desired. Image and corresponding supporting commands are then embedded within the PostScript stream being sent by the application and processed by a printer driver. At the appropriate time in the page generation, the marking device processes the image and Type 1 Imagemask and prints the image on the page.

One feature of embodiments herein relates to the nature by which the PostScript Type 1 Imagemask may be used to filter parts of images from being printed. By varying the Type 1 Imagemask, different levels of transparency may be achieved. The Type 1 Imagemask specify that whenever the 1 bit is set, marking is to take place, and whenever the 0 bit is set, no marking takes place. The empty places created by the 0 bits in the Imagemask allow the underlying printed images to a visible through the watermark. Therefore, and embodiments herein can vary (increase or decrease) the transparency of an image by controlling the image mask to eliminate bits (prevent the bit from printing). For example, the mask could be set to eliminate every other bit, every third bit, every fourth bit, two out of every three bits, three out of every four bits, etc. so as to allow any specific transparency to be achieved. Further, this transparency level can be set by the user.

The Type 1 Imagemasks used can be equal to the width and height of the image to be processed, or may be designed to represent a fraction of the image to be processed, which is then applied in a tiling pattern against the image. This methodology for creating a mask allows for faster processing on marking devices with limited capabilities.

Additionally, specific PDL command can be used to dynamically create the Type 1 Imagemask at the time the PDL is interpreted. This type of masking allows for additional levels of transparency to be applied. For example, a Type 1 Imagemask may be used to filter specific colors from the image data, for example, all white pixels may be removed in addition to those selected by the specified transparency mask.

Figure 5:
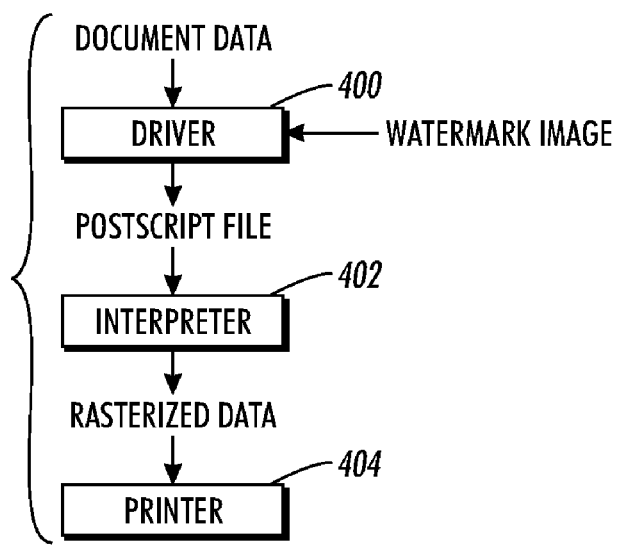
FIG. 5 is a schematic system diagram illustrating embodiments herein.
Figure 6:
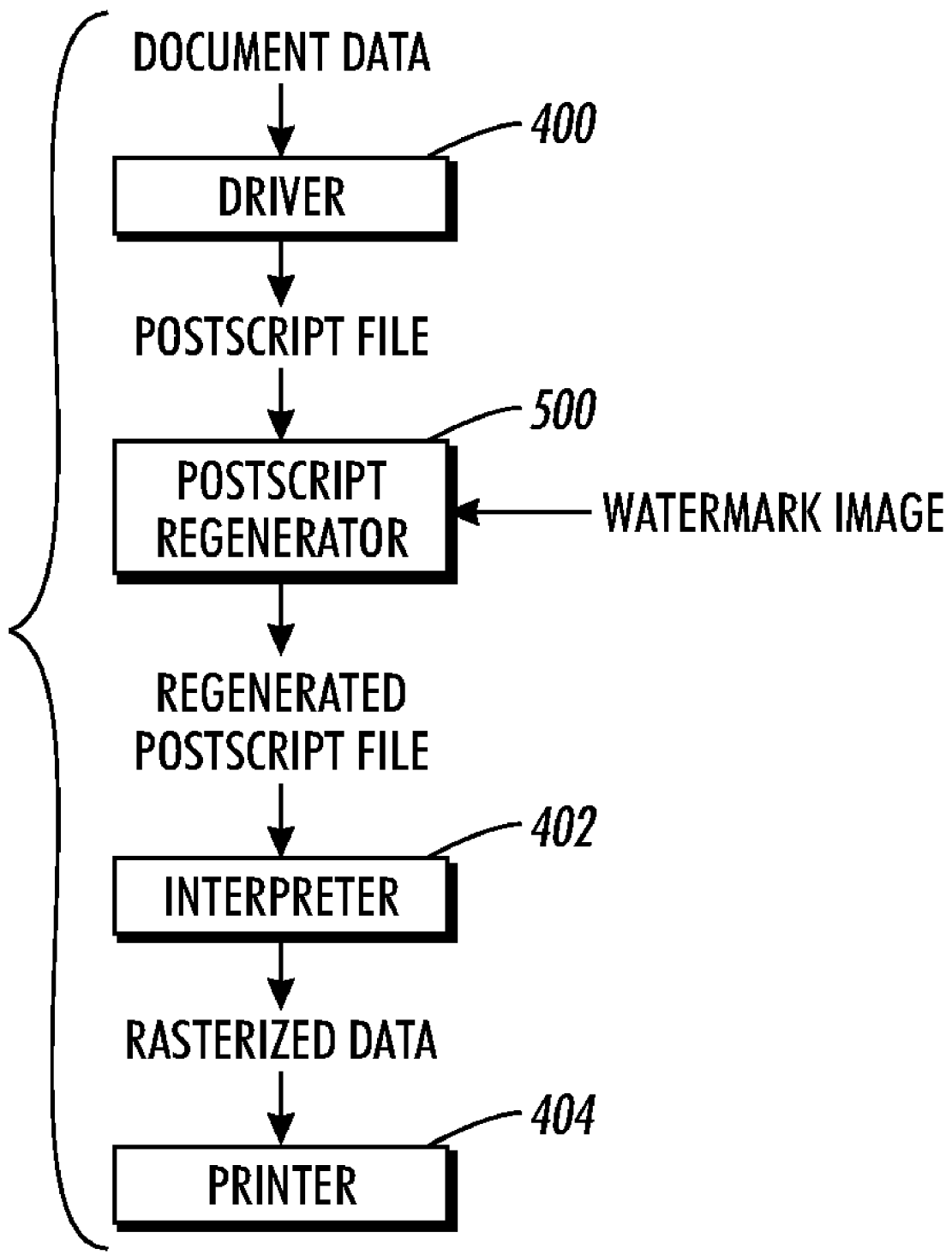
FIG. 6 is a schematic system diagram illustrating embodiments herein.

FIG. 5 is a schematic diagram illustrating that the document data and watermark image are supplied to the driver 400 which produces the PostScript file. An interpreter (raster image processor) 402 utilizes the PostScript file to produce rasterized data, which is in turn supplied to the printer 404 and printed on a media sheet. To the contrary, in a regenerated PostScript file methodology (as described, for example, in the aforementioned U.S. Patent Publication 2003/0142361) the watermark image must be combined with the PostScript file utilizing a postscript regenerator 500, as shown in FIG. 6. By utilizing the driver to generate the above-mentioned snippet from the watermark image, and then creating the PostScript file, the process shown in FIG. 5 is much more efficient than the process shown in FIG. 6. More specifically, with the process shown in FIG. 6, the PostScript file must be generated multiple times, while with the processing shown in FIG. 5 according to embodiments herein, the PostScript file is generated only a single time and is generated by driver 400.

Thus, the foregoing demonstrates a method to produce bitmap watermark images in PostScript with varying degrees of transparency. With the embodiments herein users will be able to pick a bitmap image, adjust the density of the bitmap and select a transparency level in the print driver dialog box. The print driver generates an Imagemask corresponding to the transparency level and tiles it over the watermark image. The rest of the PDL file is then processed and the transparent watermark image is printed on the output image. The embodiments herein allow level control for a binary watermark using PostScript Imagemask.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference.

Figure 7:
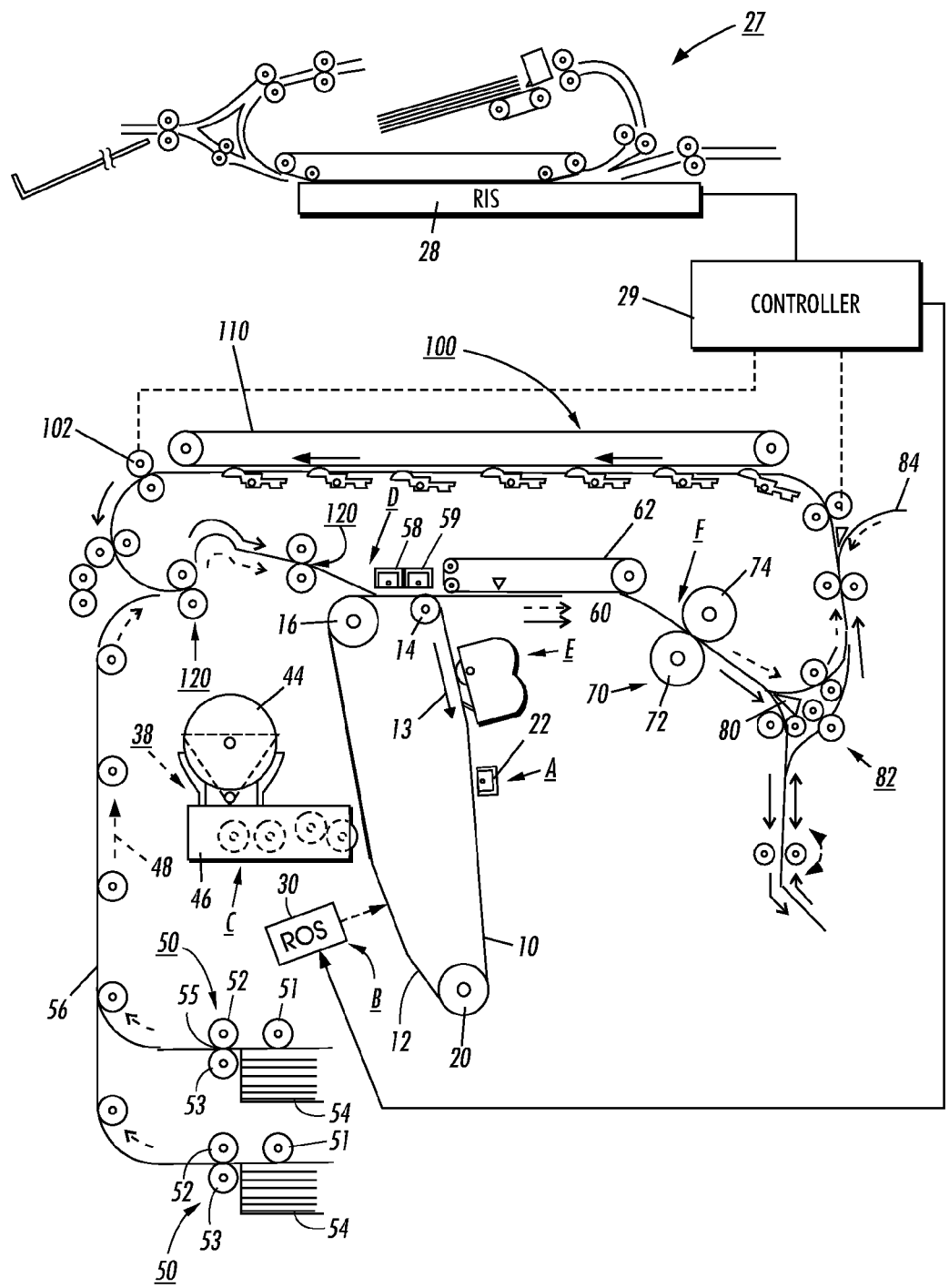
FIG. 7 is schematic diagram of a printing device used with embodiments herein.

For example, FIG. 7 schematically depicts an electrophotographic printing machine that is similar to one described in U.S. Pat. No. 6,032,004. It will become evident from the following discussion that the present embodiments may be employed in a wide variety of devices and is not specifically limited in its application to the particular embodiment depicted in FIG. 7.

Referring to FIG. 7, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 7 schematically illustrates an electrophotographic printing machine which generally employs a photoconductive belt 10. The photoconductive belt 10 can be made from a photoconductive material coated on a ground layer, which, in turn, can be coated on an anti-curl backing layer. Belt 10 moves in the direction of arrow 13 to advance successive portions sequentially through the various processing stations disposed about the path of movement thereof. Belt 10 can be entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or grayscale rendition of the image which can be transmitted to a modulated output generator, for example the raster output scanner (ROS), indicated generally by reference numeral 30. The ESS 29 can be a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 7, after the electrostatic latent image is developed, the toner powder image present on belt 10 advances to transfer station D. A print sheet 48 can be advanced to the transfer station, D, by a sheet feeding apparatus, 50. The sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. The fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll can be internally heated by a quartz lamp (not shown). Release agent, stored in a reservoir (not shown), can be pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29 and the methodology shown in FIGS. 1-5, discussed above can be programmed into hardware or software of the controller 29. The controller 29 can be a programmable microprocessor which controls all of the machine functions hereinbefore described. Thus, the controller can comprise a computer-usable data carrier storing instructions that, when executed by the controller (computer), cause the controller to perform the method steps discussed above. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A computer system-implemented method, comprising:
   receiving, by a first computer of said computer system, image data and document data;
   applying, by said first computer, a mask to said image data to produce an image snippet, said mask adjusting a transparency of said image data in said image snippet;
   combining, by said first computer, said document data and said image snippet into a single page description language file using a print driver;
   processing, by a second computer of said computer system, said single page description language file through an interpreter to produce raster data; and printing, by said second computer, said raster data on a media sheet using a printer, wherein said image data being limited to graphical, non-text data.

2. The method according to claim 1, further comprising varying said transparency according to said user input.

3. The method according to claim 1, said single page description language file comprising said snippet overlaid on said document data.

4. A computer system-implemented method, comprising:
receiving, by a first computer of said computer system, image data and document data;
applying, by said first computer, a mask to said image data to produce an image snippet, wherein said mask eliminates pixels from said image data, wherein said mask adjusts a transparency of said image data in said image snippet;
combining, by said first computer, said document data and said image snippet into a single page description language file using a print driver;
processing, by a second computer of said computer system, said single page description language file through an interpreter to produce raster data; and
printing, by said second computer, said raster data on a media sheet using a printer, wherein said image data being limited to graphical, non-text data.

5. The method according to claim 4, further comprising varying said transparency according to said user input.

6. The method according to claim 4, said single page description language file comprising said snippet overlaid on said document data.

7. A computer system-implemented method, comprising:
receiving, by a first computer of said computer system, image data and document data;
applying, by said first computer, a mask to said image data to produce an image snippet, wherein said mask adjusts a transparency of said image data in said image snippet;
combining, by said first computer, said document data and said image snippet into a single page description language file using a print driver, said image snippet being combined with said document data only by said print driver;
processing, by a second computer of said computer system, said single page description language file through an interpreter to produce raster data; and
printing, by said second computer, said raster data on a media sheet using a printer, wherein said image data being limited to graphical, non-text data.

8. The method according to claim 7, further comprising varying said transparency according to said user input.

9. The method according to claim 7, said single page description language file comprising said snippet overlaid on said document data.

10. A non-transitory computer-readable medium storing computer-executable instructions that, when executed by a first computer, cause a computer system to perform a method comprising:
using a first computer of said computer system, receiving image data and document data;
using said first computer, applying a mask to said image data to produce an image snippet, wherein said mask adjusts a transparency of said image data in said image snippet;
using said first computer, combining said document data and said image snippet into a single page description language file using a print driver;
using a second computer of said computer system, processing said single page description language file through an interpreter to produce raster data; and
using said second computer, printing said raster data on a media sheet using a printer, wherein said image data being limited to graphical, non-text data.

11. The non-transitory computer-readable medium according to claim 10, further comprising varying said transparency according to said user input.

12. The non-transitory computer-readable medium according to claim 10, said single page description language file comprising said snippet overlaid on said document data.

\* \* \* \* \*